United States Patent
Oyaizu

(10) Patent No.: US 11,932,127 B2
(45) Date of Patent: Mar. 19, 2024

(54) CONTACTLESS ELECTRICITY SUPPLY SYSTEM FOR VEHICLE

(71) Applicant: NISSAN MOTOR CO., LTD., Yokohama (JP)

(72) Inventor: Keishi Oyaizu, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 600 days.

(21) Appl. No.: 17/256,425

(22) PCT Filed: Jun. 29, 2018

(86) PCT No.: PCT/JP2018/024838
§ 371 (c)(1),
(2) Date: Dec. 28, 2020

(87) PCT Pub. No.: WO2020/003498
PCT Pub. Date: Jan. 2, 2020

(65) Prior Publication Data
US 2021/0268922 A1 Sep. 2, 2021

(51) Int. Cl.
*B60L 53/124* (2019.01)
*B60L 53/122* (2019.01)
*B60L 53/39* (2019.01)
*H02J 50/90* (2016.01)

(52) U.S. Cl.
CPC ........... *B60L 53/124* (2019.02); *B60L 53/122* (2019.02); *B60L 53/39* (2019.02); *H02J 50/90* (2016.02); *H02J 2310/48* (2020.01)

(58) Field of Classification Search
None
See application file for complete search history.

(56) References Cited

U.S. PATENT DOCUMENTS

| 10,576,842 | B2 * | 3/2020 | Koizumi | B60L 53/36 |
| 10,608,477 | B2 * | 3/2020 | Asano | B60L 53/30 |
| 2015/0084405 | A1 | 3/2015 | Koizumi et al. | |
| 2018/0026482 | A1 | 1/2018 | Asano et al. | |
| 2018/0147943 | A1 | 5/2018 | Koizumi et al. | |

FOREIGN PATENT DOCUMENTS

| CN | 104094498 A | 10/2014 |
| CN | 107112799 A | 8/2017 |
| JP | 2013-135491 A | 7/2013 |
| JP | 2013-191865 A | 9/2013 |
| JP | 2015-128363 A | 7/2015 |
| JP | 2015-164363 A | 9/2015 |
| JP | 2016-171687 A | 9/2016 |

OTHER PUBLICATIONS

Extended European Search Report, Application No. EP 18 92 5030, dated Dec. 4, 2021, 7 pages.

* cited by examiner

*Primary Examiner* — Leigh M Garbowski
(74) *Attorney, Agent, or Firm* — Foley & Lardner LLP

(57) ABSTRACT

A contactless electricity supply system for a vehicle includes a power transmitter coil unit provided on a ground-side and a lifting device for lifting up the power transmitter coil unit from the ground. The power transmitter coil unit supplies electricity to a power receiving coil unit by magnetic coupling therewith. The power transmitter coil unit includes a case that houses a power transmitter coil. A bulge is formed on an upper face of the case around a winding center axis of the power transmitter coil wounded in a planar manner in a plan view.

5 Claims, 8 Drawing Sheets

CONTACTLESS ELECTRICITY SUPPLY SYSTEM FOR VEHICLE

TECHNICAL FIELD

The present invention relates to a contactless electricity supply system for a vehicle.

BACKGROUND ART

In an electric vehicle (EV) or a plug-in hybrid vehicle (PHV), a battery for running installed thereon is electrically charged. Charging is commonly done by using a cable in the present day, but a contactless electricity supply system is also being developed. In a contactless electricity supply system, a battery is charged by electricity supplied from a power transmitter coil unit provided under ground or on the ground to a power receiving coil unit attached to a bottom of a vehicle. A patent Literature 1 listed below discloses a contactless electricity supply system that includes a power transmitter coil unit.

PRIOR-ART LITERATURE

Patent Literature

Patent Literature 1: Japanese Patent Application Publication No. 2015-128363

SUMMARY OF INVENTION

In a contactless electricity supply system, charging is done by magnetic coupling between a power transmitter coil unit and a power receiving coil unit. Here, if a foreign object exists between the power transmitter coil unit and the power receiving coil unit, specifically on the power transmitter coil unit, the charging is affected by it. Especially if the foreign object is metal, its affection to magnetic flux is noticeable, and thereby it may cause inhibition of the charging. The above-mentioned Patent Literature 1 also discloses an apparatus for detecting a foreign object in the contactless electricity supply system. However, even if a foreign object can be detected, charging is affected by the existence of the foreign object (a system that stops charging is also developed). Therefore, it is desired to restrict incursion of a foreign object further.

An object of the present invention is to provide a contactless electricity supply system that can restrict incursion of a foreign object and can reduce affection of incursion of a foreign object.

An aspect of the present invention provides a contactless electricity supply system that includes a power transmitter coil unit provided on a ground-side, and an elevation device for shifting the power transmitter coil unit upward from the ground. Here, the power transmitter coil unit supplies electricity to a power receiving coil unit provided on a vehicle-side by magnetic coupling with the power receiving coil unit. The power transmitter coil unit has a case that houses a power transmitter coil wound in a planar manner. A bulge is formed around a center axis of the power transmitter coil on an upper face of the case so as to bulge upward from its surrounding surface.

Note that, hereinafter with respect to the contactless electricity supply system, the term "ground-side" includes a case of "on the ground" and a case of "under the ground", and means a side paired up with the "vehicle-side". In addition, the term "ground-side" also includes a case of a "floor-side" in consideration of the system that is set up in an intermediate floor of a building. This "floor-side" also includes a case of "on the floor" and a case of "under the floor".

Effects by Invention

According to the aspect, by providing the bulge on the upper face of the power transmitter coil unit, it becomes possible to restrict incursion of a foreign object onto the bulge made one-step higher while electricity is not supplied. In addition, incursion of a foreign object onto the bulge (i.e. between the power transmitter coil unit and the power receiving coil unit) can be restricted more surely by making the bulge close to (contacted with) the bottom face of the power receiving coil unit while electricity is supplied. Further, the power transmitter coil capable of being lifted up can be made close to (contacted with) the power receiving coil unit installed in the vehicle while electricity is supplied. Therefore, a power output required for the electricity supply can be reduced, and thereby, even if a foreign object enters onto the power transmitter coil unit, affection to the power transmission due to the foreign object can be reduced.

DESCRIPTION OF EMBODIMENTS

Hereinafter, a contactless electricity supply system for a vehicle according to an embodiment will be explained with reference to the drawings. First, configurations of an entire of the system will be explained with reference to FIG. 1 and FIG. 2.

(Configuration of Contactless Electricity Supply System)

Figure 1:
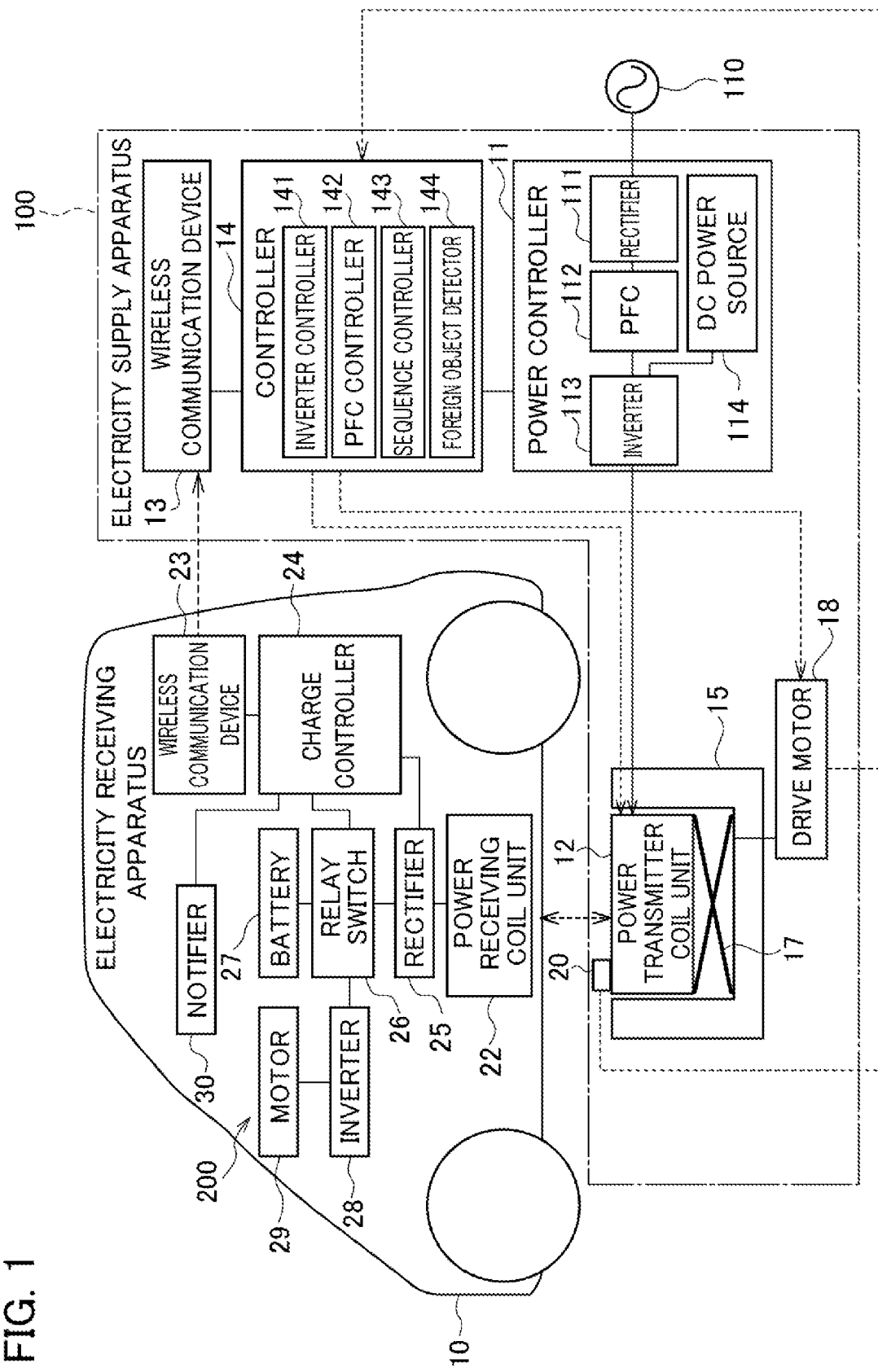
FIG. 1 is a configuration 1 diagram of a contactless electricity supply system for a vehicle according to an embodiment.
Figure 2:
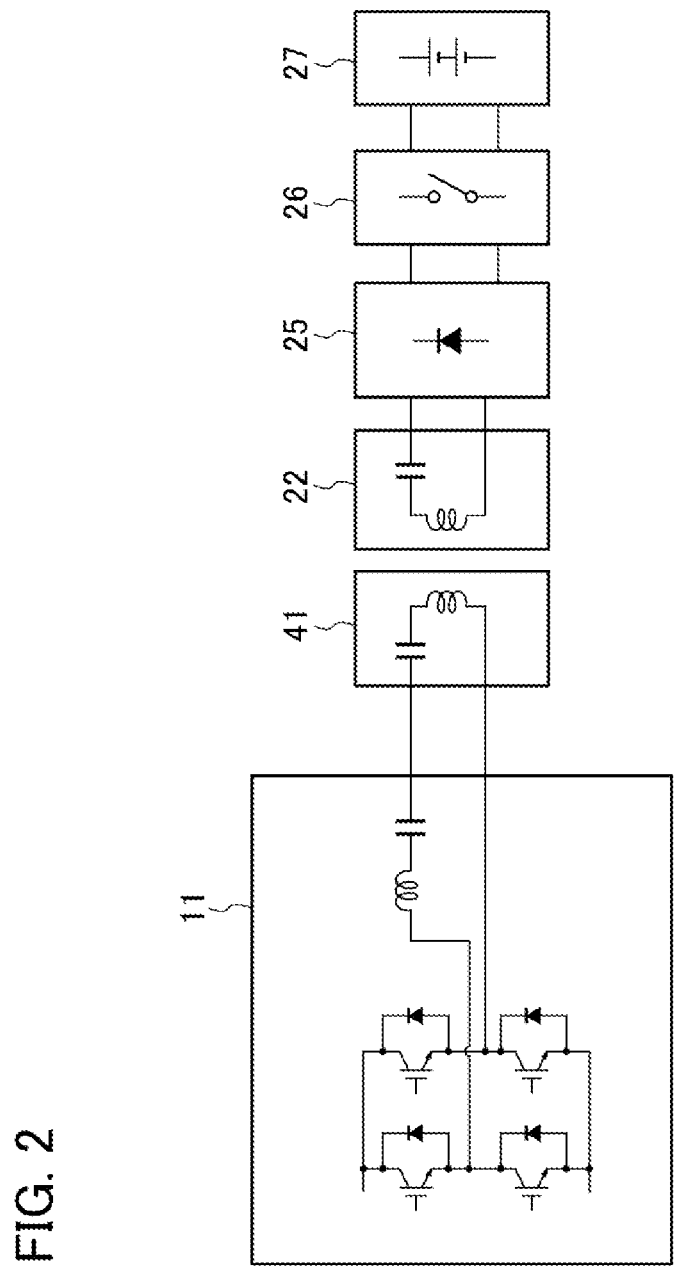
FIG. 2 is a conceptual configurational diagram of the contactless electricity supply system.

As shown in FIG. 1, the contactless electricity supply system includes an electricity supply apparatus 100 that is a ground-side unit, and an electricity receiving apparatus 200 that is a vehicle-side unit. The contactless electricity supply system supplies electricity contactlessly from the electricity supply apparatus 100 provided at an electricity supply station or the like to the electricity receiving apparatus 200 installed in a vehicle 10 such as an EV and a PHV to charge a battery 27 installed in the vehicle 10.

The electricity supply apparatus 100 includes a power transmitter coil unit 12 disposed at a parking space near the charging station. On the other hand, the electricity receiving apparatus 200 includes a power receiving coil unit 22 installed on a bottom of the vehicle 10. The power receiving coil unit 22 is disposed such that it faces to the power transmitter coil unit 12 when the vehicle 10 is parked at a predetermined position (chargeable position) in the parking space.

Figure 3:
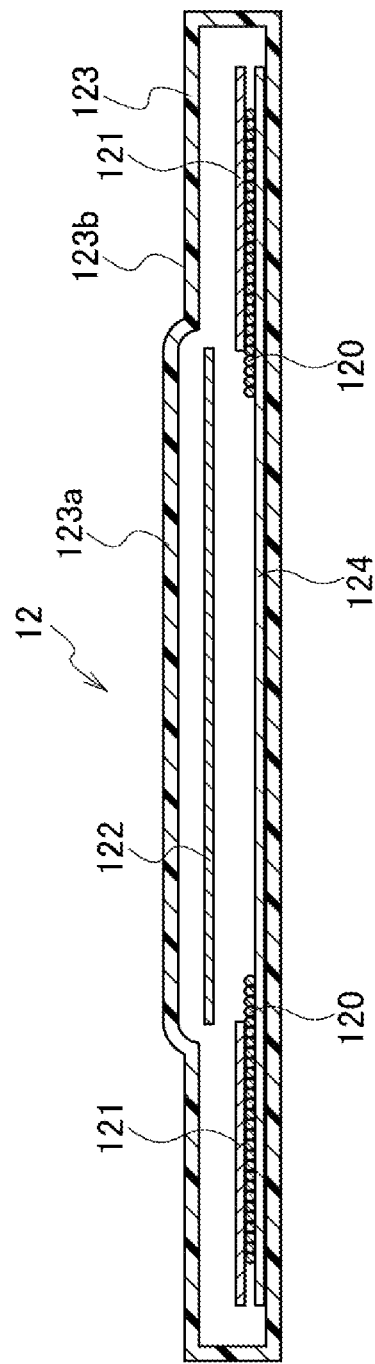
FIG. 3 is a cross-sectional view of a power transmitter coil unit of the contactless electricity supply system.
Figure 4:
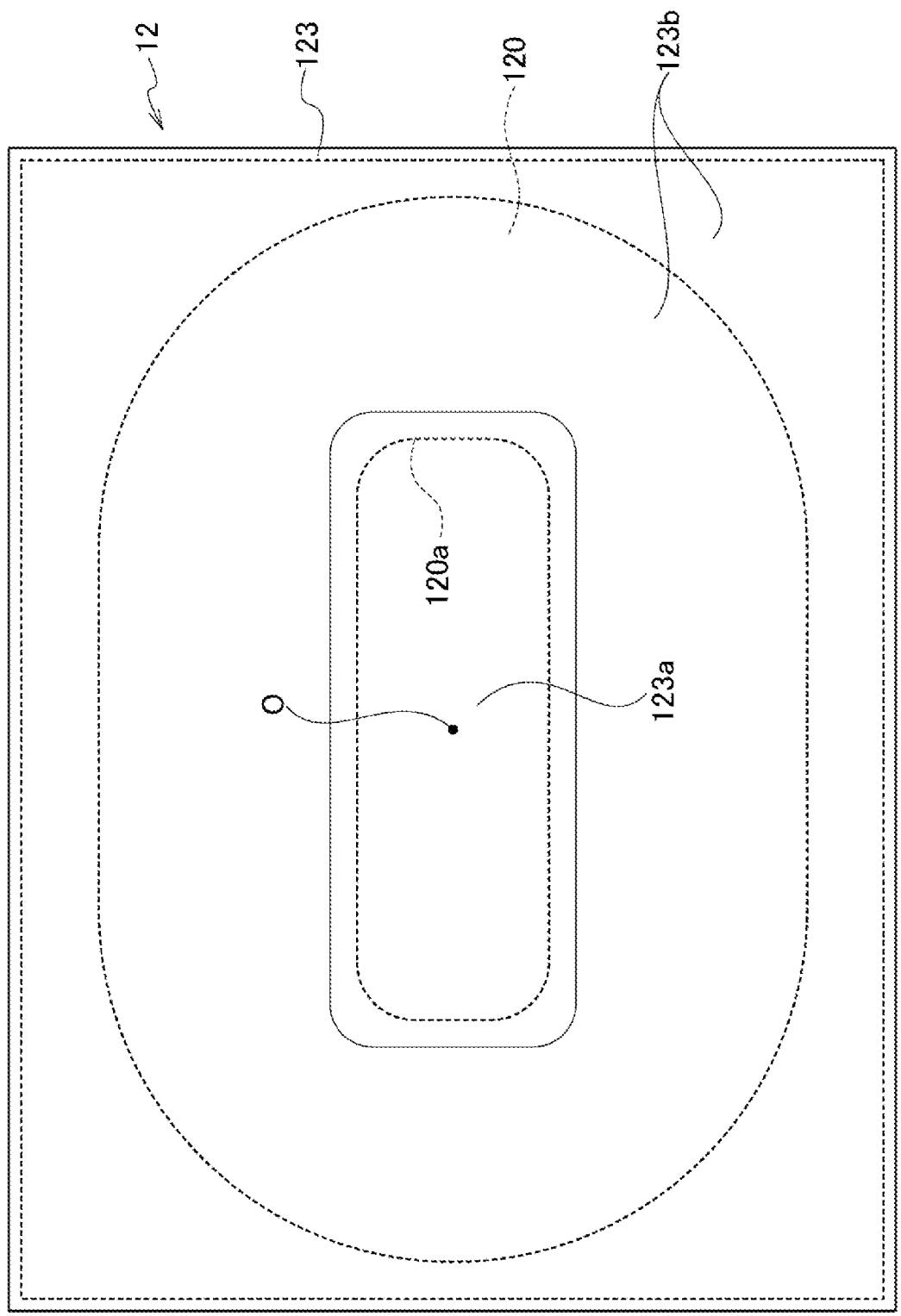
FIG. 4 is a plan view of the power transmitter coil unit.

A power transmitter coil 120 (see FIG. 3 and FIG. 4) housed in the power transmitter coil unit 12 is configured by a primary coil made by conductive wire(s), and supplies electricity to the power receiving coil unit 22. The power transmitter coil unit 12 will be explained later in detail. In addition, a power receiving coil 220 (see FIG. 7) housed in the power receiving coil unit 22 is similarly configured by a secondary coil made by conductive wire(s), and receives the electricity from the power transmitter coil unit 12. In the present embodiment, the electricity can be supplied from the power transmitter coil unit 12 to the power receiving coil unit 22 by electromagnetic induction between the both coil units 12 and 22.

The electricity supply apparatus 100 includes an electricity controller 11, the power transmitter coil unit 12, a wireless communication device 13, a controller 14, a base 15, a lifting link mechanism 17, a drive motor 18 and a distance sensor 20. In the present embodiment, a lifting device for vertically lifting-up the power transmitter coil unit 12 from the ground is configured by the lifting link mechanism 17 and the drive motor 18. Note that the lifting device that shifts the power transmitter coil unit 12 vertically above from the ground may be configured by a rotational moto and a gear mechanism, or may be configured by a hydraulic cylinder. The base 15 is buried under the ground, and supports the lifting device surely from beneath.

The electricity controller 11 converts AC power transmitted from an AC power source 110 to high-frequency AC power, and then supplies it to the power transmitter coil unit 12. The electricity controller 11 includes a rectifier 111, a PFC circuit 112, a DC power source 114 and an inverter 113.

The rectifier 111 is electrically connected with the AC power source 110, and rectifies the AC power output from the AC power source 110. The PFC circuit 112 is connected to the electrical connection between the rectifier 111 and the inverter 113, and improves power factor by fixing up an output waveform from the rectifier 111.

The inverter 113 is provided with a PWM control circuit configured by switching elements such as IGBT or the like, and converts DC power to AC power based on switching control signals to supply the electricity to the power transmitter coil unit 12. The DC power source 114 outputs DC power for magnetic excitation of the power transmitter coil 120.

The wireless communication device 13 communicates bi-directionally with a wireless communication device 23 provided in the vehicle 10.

The controller 14 is a unit for integrally controlling the electricity supply apparatus 100, and includes an inverter controller 141, a PFC controller 142, a sequence controller 143 and a foreign object detector 144. The controller 14 executes a judgement process of a parking position when the vehicle 10 is parked at the parking space. At that time, the PFC (Power Factor Correction) controller 142 generates an exciting power command, and the inverter controller 141 controls the inverter 113 by generating a frequency command and a duty ratio for the exciting power. According to these, the controller 14 transmits the power for judging the parking position from the power transmitter coil unit 12 to the power receiving coil unit 22.

In the judgement process of the parking position, the controller 14 supplies the power for judging the parking position by turning the power transmitter coil unit 12 into a weak excitation state (excitation weaker than that in a normal charging). In addition, the sequence controller 143 exchanges sequence information with the electricity receiving apparatus 200 via the wireless communication device 13. The foreign object detector 144 is connected with after-explained foreign object detection coils 121 and 122 (see FIG. 3) housed within the power transmitter coil unit 12. The foreign object detector 144 detects a foreign object above the first foreign object detection coil 121 based on induction voltage generated in the first foreign object detection coil 121, and, in addition, detects a foreign object above the second foreign object detection coil 122 based on induction voltage generated in the second foreign object detection coil 122.

On the other hand, the electricity receiving apparatus 200 includes the power receiving coil unit 22, the wireless communication device 23, a charge controller 24, a rectifier 25, a relay 26, a battery 27, an inverter 28, a motor 29 and a notifier 30.

The charge controller 24 controls charging of the battery 27. The charge controller 24 executes the judgement process of the parking position when the vehicle 10 is parked at the parking space. In addition, the charge controller 24 monitors electricity received by the power receiving coil unit 22. Further, the charge controller 24 detects the position of the power receiving coil unit 22 (i.e. the position of the vehicle 10) with respect to the power transmitter coil unit 12 based on voltage received by the power receiving coil unit 22 when the power transmitter coil unit 12 is magnetically excited.

The charge controller 24 also controls the wireless communication device 23, the notifier 30, the relay 26 and so on. The charge controller 24 sends a charging start signal to the controller 14 of the electricity supply apparatus 100 via the wireless communication device 23. The rectifier 25 is connected with the power receiving coil unit 22, and converts AC power received by the power receiving coil unit 22 to DC power by rectification to supply it to the battery 27 or the inverter 28 (see FIG. 2).

With respect to the relay 26, its on/off is switched over by the control of the charge controller 24. In addition, if the relay 26 is switched off, the battery 27 and the rectifier 25 are electrically disconnected (see FIG. 2). The battery 27 is an electric power source of the vehicle 10 that is configured by connecting plural secondary batteries.

The inverter 28 is provided with a PWM control circuit configured by switching elements such as IGBT or the like. The inverter 28 converts AC power output from the battery 27 to DC power based on switching control signals to supply it to the motor 29.

The motor 29 is a three-phase AC motor, for example, and is a drive source for running the vehicle 10. The notifier 30 is configured by a warning lamp, a display of a navigation device, a speaker or the like, and notifies various information to a user based on the control of the charge controller 24.

(Configuration of Power Transmitter Coil Unit)

Next, the power transmitter coil unit 12 will be explained more in detail with reference to FIG. 3 to FIG. 7. Note that the power transmitter coil unit 12 includes the distance sensor 20 for detecting the distance to the power receiving coil unit 22 as shown in FIG. 1, but the distance sensor 20 is not shown in FIG. 3 to FIG. 7.

The power transmitter coil unit 12 houses the power transmitter coil 120 and the foreign object detection coils 121 and 122 within its case 123. The power transmitter coil 120 is magnetically coupled with the power receiving coil 220 housed in the power receiving coil unit 22 to supply electricity contactlessly. The case 123 protects various devices provided in itself (such as the power transmitter coil 120 and the foreign object detection coils 121 and 122). The case 123 possesses strength and rigidity enough to endure when the vehicle 10 runs onto it. In addition, in a case where the power transmitter coil unit 12 is provided in an outdoor environment, the case 123 also possesses enough weathering resistivity. For example, the case 123 is made of material, such as resin, that doesn't inhibit the above-mentioned magnetic coupling.

The power transmitter coil 120 is wound in a ring manner about a winding center axis O, and is wound in a planar manner so as to have an oval outline shape in the present embodiment. The winding center axis (coil axis) O is an axis that passes through a winding center and is perpendicular to a winding plane. The winding center is a median point (geometric center) of a flat figure formed by an arbitrary single winding of the power transmitter coil 120. Therefore, the power transmitter coil 120 has the oval outline shape at whose center (i.e. around the winding center O) a hole is formed. The shape of the center hole (i.e. an inner circumferential edge 120a) of the power transmitter coil 120 is a rectangular shape but its four corner are rounded (see FIG. 4).

The power receiving coil 220 is also wound in a ring manner about its winding center axis, and is wound in a planar manner so as to have an oval outline shape. The power receiving coil 220 also has an oval outline shape having a hole at its center (i.e. around its winding center). The power receiving coil 220 is smaller than the power transmitter coil 120, but slightly larger than the center hole of the power transmitter coil 120 (see FIG. 7). It is most preferable that the contactless electricity supply is done while the winding center axis of the power transmitter coil 120 and the winding center axis of the power receiving coil 220 are made completely coincident with each other.

A ferrite 124 is lied in a planar manner on an inner bottom face of the case 123, and its whole shape is a rectangular shape larger than the power transmitter coil 120. The power transmitter coil 120 is disposed on an upper face of the ferrite 124. The power transmitter coil 120 is connected to the electricity controller 11 (the inverter 113) as explained above. Note that the foreign object detection coils 121 and 122 and the ferrite 124 are not shown in FIG. 4.

The first foreign object detection (FOD) coil 121 that has an oval shape at whose center a hole is formed is disposed on the power transmitter coil 120. The bulge 123a and a surrounding surface 123b that is one-step lower than the bulge 123a and surrounds it are formed on the case 123. The bulge 123a will be explained later more in detail. The first FOD coil 121 detects a foreign object on the surrounding surface 123b. The second FOD coil 122 having an almost rectangular shape is provided on an inward side of the first FOD coil 121 having the oval ring shape. In other words, the second FOD coil 122 is disposed beneath the bulge 123a to detect a foreign object on the bulge 123a.

The second FOD coil 122 is disposed higher than the first FOD coil 121. A distance from the first FOD coil 121 to the surrounding surface 123b and a distance from the second FOD coil 122 to the upper face of the bulge 123a are almost identical to each other. In other words, a distance from the first FOD coil 121 to its detection reference plane and a distance from the second FOD coil 122 to its detection reference plane are made identical to each other. The first FOD coil 121 and the second FOD coil 122 are connected to the controller 14 (the foreign object detector 144) as explained above.

As explained above, the bulge 123a is formed on the upper face of the case 123. The bulge 123a is formed around the above-mentioned winding center axis O of the power transmitter coil 120 in a plan view (see FIG. 4). An area of the center hole of the power transmitter coil 120 formed around the winding center axis O is an area where strong magnetic flux is generated while electricity is supplied, and incursion of a foreign object onto the power transmitter coil unit 12 is restricted by forming the bulge 123a. Incursion restriction of a foreign object will be explained later more in detail. The surrounding surface 123b is formed around the bulge 123a, and the surrounding surface 123b is a flat surface and is made flush with the ground surface while the power transmitter coil unit 12 positions at its moved-down position. The upper face of the bulge 123a is parallel to the surrounding surface 123b.

In the plan view (see FIG. 4), the bulge 123a is formed around the winding center axis O of the power transmitter coil 120 as explained above, and the inner circumferential edge 120a of the ring-shaped power transmitter coil 120 is disposed on an inward side of the bulge 123a. In the present embodiment, the bulge 123a is raised upward from the surrounding surface 123b at a position just outside the inner circumferential edge 120a in the plan view. Note that the bulge 123a may be raised at a position almost coincident with the inner circumferential edge 120a as long as it includes the inner circumferential edge 120a within itself in the plan view.

Therefore, the bulge 123a also has an identical shape to that of the inner circumferential edge 120a, i.e. a rectangular shape whose four corners are rounded. Note that some sort of pattern (e.g. pattern as aesthetic design, pattern for anti-slipping or the like) may be formed on the surface of the case 123, and asperity of such patterns (minute height difference) is not a "bulge". In addition, only one "bulge" is provided around the winding center axis O in the present embodiment, and it is formed such that its upper face becomes a single flat surface.

Figure 5:
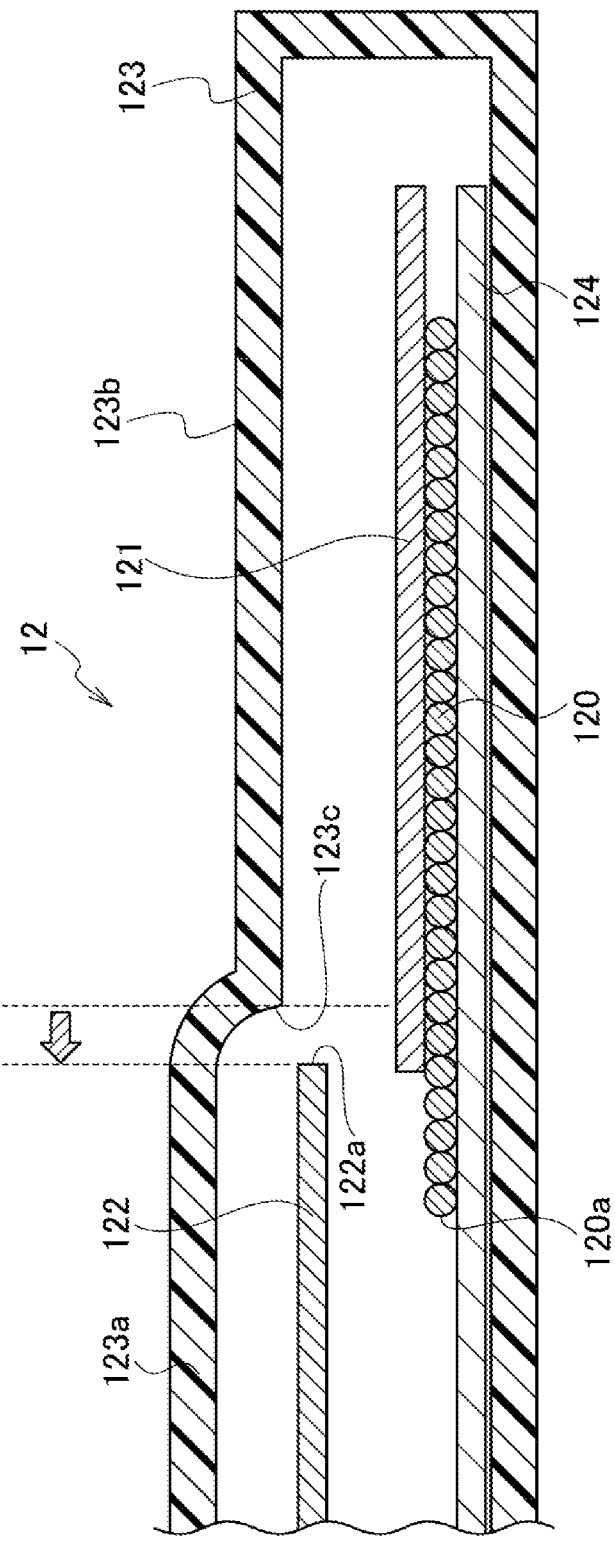
FIG. 5 is a partial cross-sectional view of the power transmitter coil unit.

Positional relation between the bulge 123a and the above-mentioned second FOD coil 122 (the first FOD coil 121) is shown in FIG. 5. An outer circumferential edge 122a of the second FOD coil 122 is disposed on an inward side from a boundary inner circumferential edge 123c of the bulge 123a (on an inner face of the case 123) (see an arrow in FIG. 5). In the present embodiment, the outer circumferential edge 122a is made coincident with a position where the upper face of the bulge 123a shifts from a curved surface to a flat surface. FIG. 5 shows a cross-sectional plane (called as a reference cross-sectional plane, hereinafter), which includes an arbitrary point on the inner circumferential edge 120a, which is perpendicular to a tangential line of the inner circumferential edge 120a at the arbitrary point, and which is parallel to the above-mentioned winding center axis O. The positional relation shown in FIG. 5 is satisfied along an entire circumference of the bulge 123a (the inner circumferential edge 120a). By this configuration, a thickness of a boundary (circumferential edge) portion of the bulge 123a can be secured sufficiently, and degradation of strength and rigidity of the upper plate of the case 123 can be avoided. Especially, since stress tends to concentrate to the boundary portion of the bulge 123a, securement of strength and rigidity of this portion is important.

In addition, an inner circumferential edge portion of the first FOD coil 121 is positioned so as to overlap a convex side wall of the bulge 123a. According to this configuration, the first FOD coil 121 can cover an area that is hardly detected by the second FOD coil 122. Note that the side wall of the bulge 123a may be formed as a concave side wall or a sloped plat side wall. (But, even in a case of the sloped flat side wall, within its sections where the boundary of the bulge 123a in the plan view curve, the surface of the sloped flat side wall curves along its circumferential direction.)

Figure 6:
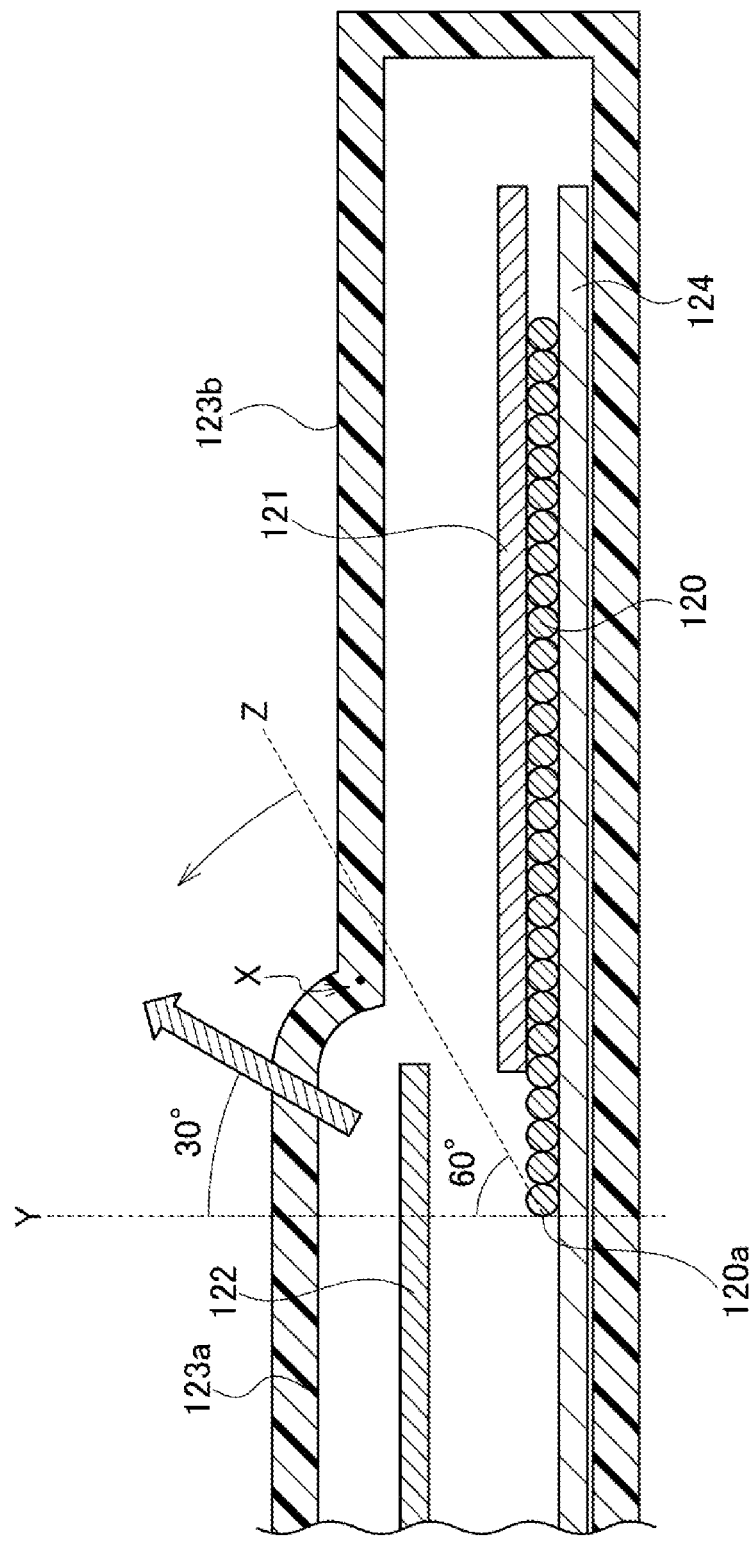
FIG. 6 is a partial cross-sectional view of the power transmitter coil unit.

Positional relation between the bulge 123a and (the inner circumferential edge 120a of) the power transmitter coil 120 is shown in FIG. 6. As explained above, the bulge 123a is formed around the winding center axis O and the inner circumferential edge 120a is included within the bulge 123a in the plan view. This positional relation will be explained more in detail. FIG. 6 also shows the above-mentioned reference cross-sectional plane, and the positional relation shown therein is satisfied along an entire circumference of the bulge 123a (the inner circumferential edge 120a). As shown in FIG. 6, defined are a boundary point (boundary line) X of the bulge 123a, a perpendicular line (perpendicular plane) Y that passes through the inner circumferential edge 120a and is perpendicular to the power transmitter coil 120, and a reference oblique line (reference oblique plane) Z that passes thorough the inner circumferential edge 120a and is oblique at 60° with respect to the perpendicular line Y to the outer side. Here, the boundary point X positions on the outer side from the perpendicular line Y and on the inner side from the reference oblique line Z. That is to say, the bulge 123a is disposed inside the reference oblique plane formed by the reference oblique line Z along an entire circumference of the inner circumferential edge 120a.

As explained above, an area of the center hole of the power transmitter coil 120 is the area where strong magnetic flux is generated while electricity is supplied, and a foreign object is restricted from entering into this area. It is known by the inventors though actual measurements (distance between the power transmitter coil 120 and the power receiving coil 220: 150 mm) that radiated magnetic flux gets strongest at about 30° with respect to the perpendicular line Y near the inner circumferential edge 120a (see an arrow in FIG. 6). On an outer side from this, the magnetic flux gets weak and its directionality shifts to the lateral direction, and thereby it hardly contributes to the electricity supply. On the other hand, on an inner side from this, i.e. above the center hole of the power transmitter coil 120 (above the bulge 123a), the magnetic flux gets weak only slightly and its directionality is almost parallel to the perpendicular line Y, and thereby the above-mentioned strong magnetic area is formed. Therefore, it is sufficient for utilizing the strong magnetic flux to cover to 60° with respect to the perpendicular line Y at a maximum. By forming the bulge 123a so as to satisfy the above conditions, the area where the strong magnetic flux is generated can be covered surely, and thereby it becomes possible to restrict incursion of a foreign object into the area effectively. Incursion of a foreign object by the bulge 123a will be explained later more in detail.

Note that, in the present embodiment, the power transmitter coil unit 12 is lifted up by the lifting device (the lifting link mechanism 17 and the drive motor 18) while electricity is supplied to make the power transmitter coil unit 12 close to (contacted with) the power receiving coil unit 22. By making the power transmitter coil unit 12 close to (contacted with) the power receiving coil unit 22, a power output required for the electricity supply can be reduced. Therefore, even if a foreign object that cannot be detected by the FOD coils 121 and 122 and the foreign object detector 144 still remains on the power transmitter coil unit 12, temperature rise of the foreign object (e.g. metal) due to the magnetic flux during the electricity supply can be restricted. In addition to the reduction of the required power output during the electricity supply, leakage of the magnetic flux to the environment can be also reduced, because the power transmitter coil unit 12 is made close to a vehicle body and the vehicle body functions as a radio shielding material.

Further, while the power transmitter coil unit 12 is lifted up, the distance sensor 20 monitors the distance to the power receiving coil unit 22. Even if a foreign object that cannot be detected by the FOD coils 121 and 122 and the foreign object detector 144 still remains on the power transmitter coil unit 12, there is possibility for enabling detection of the foreign object (e.g. a large-sized foreign object) because the approach of the power transmitter coil unit 12 to (contacting thereof with) the power receiving coil unit 22 is inhibited.

Furthermore, although a required minimum ground clearance is different for a sedan and an SUV, a design flexibility of the vehicle 10 can be improved in a case where the power transmitter coil unit 12 is lifted up so as to be optimized with the height level of the power receiving coil unit 22. For example, it can be avoided that the power receiving coil unit 22 of an SUV have to be disposed at a lower level. And, one type of a contactless electricity supply system becomes compatible with both a sedan and an SUV. Since the vertical positional relation between the power transmitter coil unit 12 and the power receiving coil unit 22 during the electricity supply can be always made optimized, efficiency of the electricity supply can be always maintained best.

Note that monitoring of the lift-up of the power transmitter coil unit 12 is done not by the distance sensor 20, but may be done based on an operational state of an actuator(s) of the lifting device (the drive motor 18 and so on). For example, if the actuator is a servomotor, the lift-up of the power transmitter coil unit 12 can be monitored based on the operational state of the servomotor. In addition, the electricity supply is not affected when the power transmitter coil unit 12 is not contacted with the power receiving coil unit 22 and a small clearance is formed between the two. Even with such a small clearance formed due to mechanical accuracy of the lifting device, the electricity supply can be done as long as the power transmitter coil unit 12 and the power receiving coil unit 22 are made close to each other.

Figure 7:
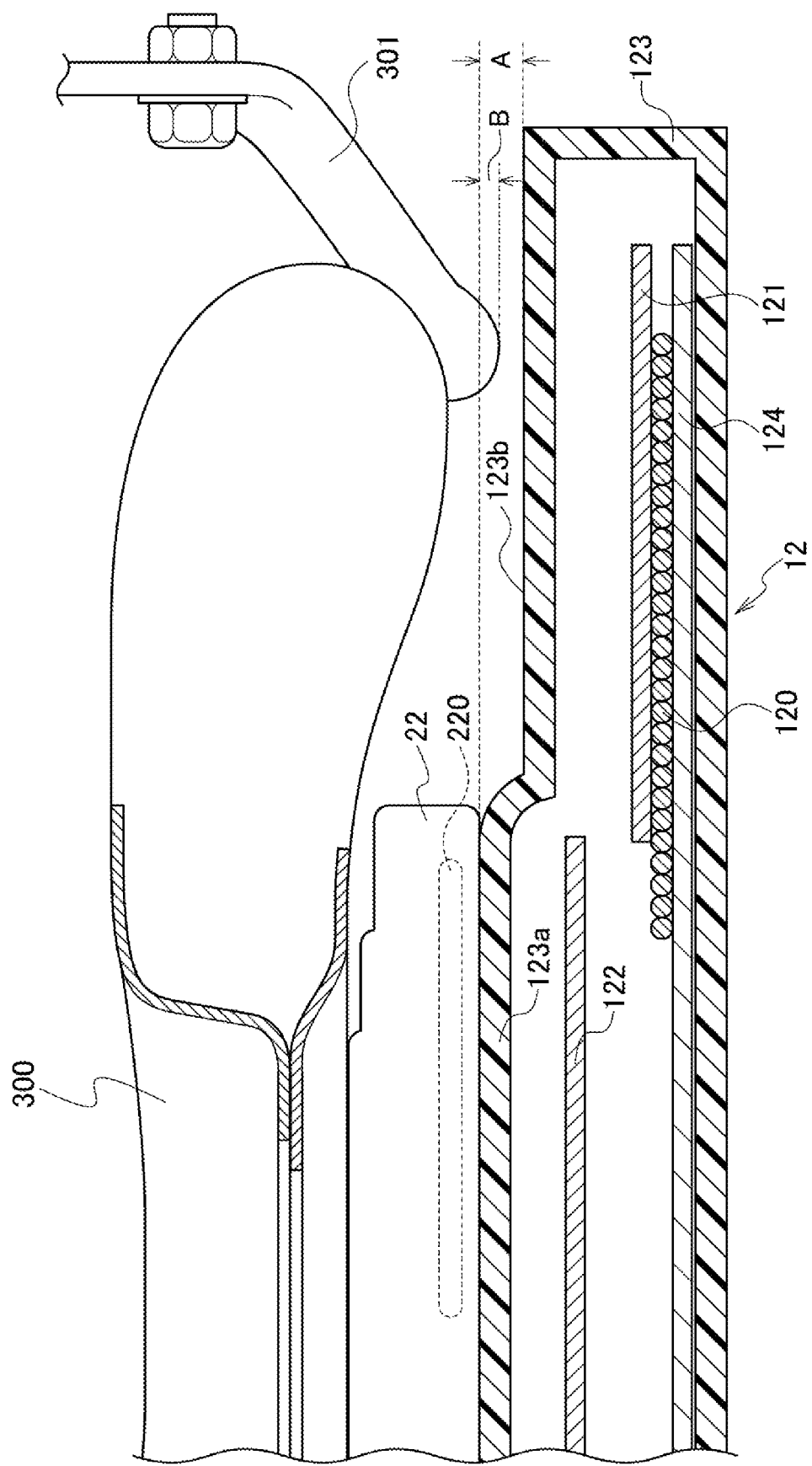
FIG. 7 is a partial cross-sectional view of the power transmitter coil unit and a power receiving coil unit.

The positional relation between the power transmitter coil unit 12 and the power receiving coil unit 22 during the electricity supply is shown in FIG. 7. Note that only one side of the vehicle 10 is shown in FIG. 7 but the other side is also formed symmetrically. The power transmitter coil unit 12 is shown by its cross-sectional view in FIG. 7, but the power receiving coil unit 22 is shown only by its outline shape. In addition, parts that are not required for the explanations are not shown in FIG. 7. The power receiving coil unit 22 is attached to a subframe 300 of the vehicle 10. The subframe 300 is also shown by being simplified. In FIG. 7, the power transmitter coil unit 12 is lifted up, and thereby the upper face of the bulge 123a is contacted with (made close to) the bottom face of the power receiving coil unit 22. The bottom face of the power receiving coil unit 22 is a flat surface similarly to the upper face of the bulge 123a. A suspension part 301 is disposed above the surrounding surface 123b.

A size of the power receiving coil unit 22 in the plan view in the present embodiment is identical or almost identical to a size of the bulge 123a in the plan view (i.e. the area of the above-explained strong magnetic flux effectual for the electricity supply). In the vehicle 10, many parts such as the part 301 are disposed around the power receiving coil unit 22. Here, the position of the surrounding surface 123b can be made lower by providing the bulge 123a. As the result, a clearance can be provided between the part 301 and the surrounding surface 123b, and thereby layout flexibility of the parts around the power receiving coil unit 22 can be improved.

Specifically, a height A of the bulge 123a and a protruding length B of the part 301 from the bottom face of the power receiving coil unit 22 are defined as shown in FIG. 7. A>B is satisfied in the layout shown in FIG. 7, and a clearance (A-B) is made between the surrounding surface 123b and the part 301. In other words, the protruding length B, from the bottom face of the power receiving coil unit 22, of the part 301 that protrudes downward from the bottom face is made smaller than the height A of the bulge 123a from the upper face of the case 123. This condition is satisfied in an area of the size of the power transmitter coil unit 12 in a state where the power receiving coil unit 22 and the bulge 123a are made coincident with each other in the plan view.

Note that, if unable to approach a parking space in a straight line, it is preferable to locate the power transmitter coil unit 12 on a far side in the parking space in consideration of paths of wheels. According to such a location, the wheels can be prevented from passing over the power transmitter coil unit 12 as much as possible. In consideration of such a circumstance, the power receiving coil unit 22 is disposed in a front section of a vehicle under assumption of forward running parking, or the power receiving coil unit 22 is disposed in a rear section of a vehicle under assumption of reverse running parking. In other words, it is assumed that suspension parts are located around the power receiving coil unit 22. Due to requirement of suspension geometry (especially, a position of a swing center of an arm, a beam, a rod, a link and so on), some of the suspension parts are desired to be located at a lower position. In such a case, it is very useful that the position of the surrounding surface 123b can be made lower by providing the bulge 123a.

(Operations of Contactless Electricity Supply System)

Figure 8:
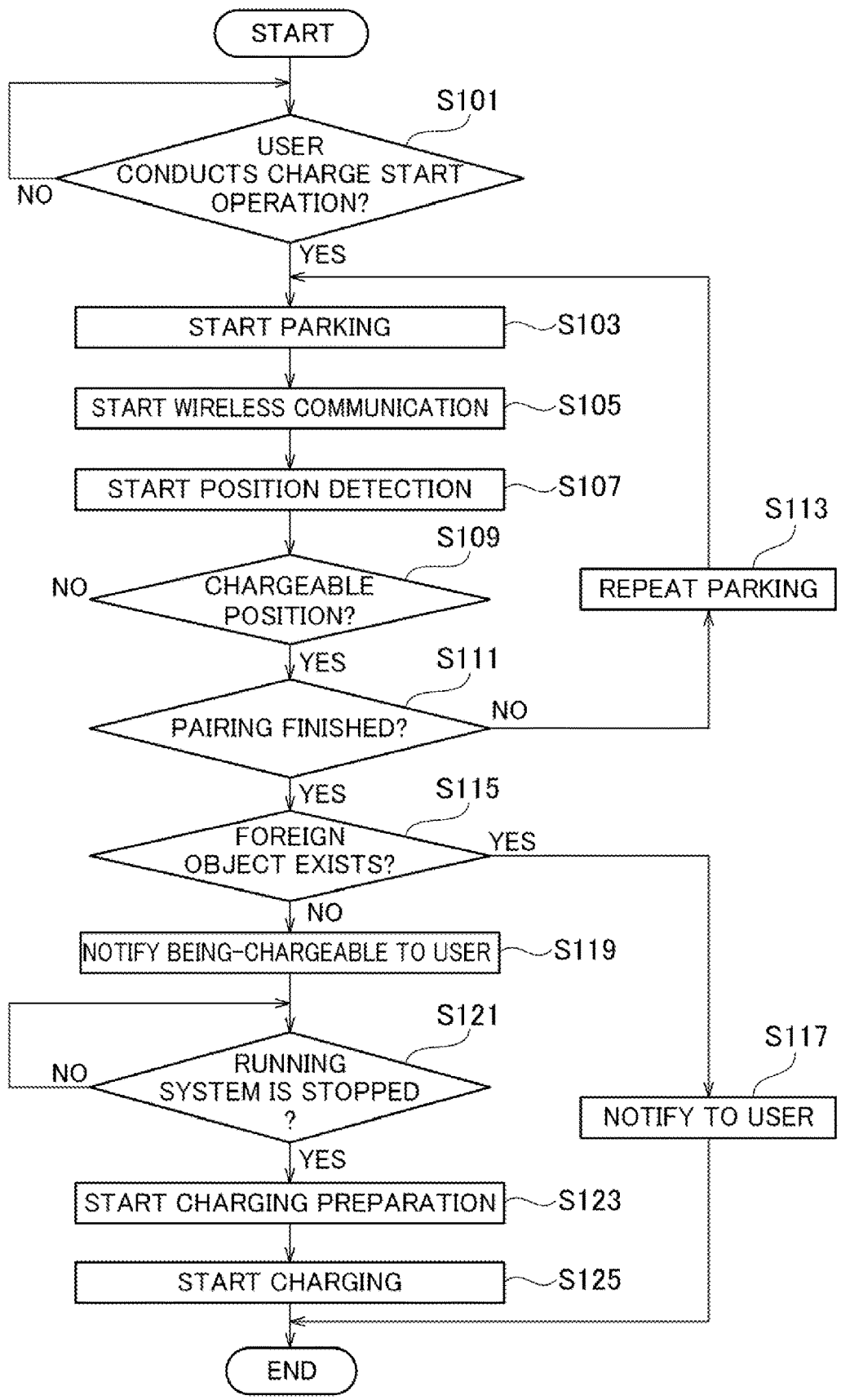
FIG. 8 is a flowchart showing operations of the contactless electricity supply system.

Operations of the above-explained contactless electricity supply system will be explained with reference to a flowchart shown in FIG. 8.

The charge controller 24 determines whether or not a user conducts a charge start operation (step S101). For example, the charge start operation is a user's operation of a charge start switch provided in a passenger compartment of the vehicle 10. If the user conducts the charge start operation (Yes in the step S101), the user starts parking by running the vehicle 10 (step S103). Note that the parking may be started automatically by the vehicle 10 according to its auto parking system. On the other hand, if the user doesn't conduct the charge start operation (No in the step S101), the process flow is looped until the charge start operation is conducted.

When the parking is started in the step S103, the charge controller 24 starts wireless communication with the controller 14 via the wireless communication device 23 (step S105). The charge controller 24 sends a weak excitation request command to the controller 14 when the vehicle 10 gets close to the parking space.

The controller 14 detects the position of the power receiving coil unit 22 (step S107). The controller 14 supplies the electricity for the weak excitation of the power transmitter coil unit 12 based on the weak excitation request command that is received by it in the step S105. The charge controller 24 judges that the power receiving coil unit 22 positions within the chargeable area when electricity received by the power receiving coil unit 22 takes a value not smaller than a predetermined value. The controller 14 also confirms this judgment through the wireless communication devices 13 and 23.

When the power receiving coil unit 22 positions within the chargeable area (Yes in the step S109), the controller 14 conducts pairing of the power transmitter coil unit 12 and the power receiving coil unit 22 (step S111). The pairing is execution of authentication for combination of the power receiving coil unit 22 and the power transmitter coil unit 12 that will supply electricity. For example, the pairing is a process for preventing an improper activation of an adjacent charging station in a parking lot in which parking stations are aligned.

When the controller 14 completes the pairing (Yes in the step S111), the controller 14 detects whether or not a foreign object exists above the power transmitter coil unit 12 by using the FOD coils 121 and 122 (step S115). In a case where a foreign object exists above the power transmitter coil unit 12 (Yes in the step S115), the notifier 30 notifies to the user that a foreign object exists above the power transmitter coil unit 12 (step S117) and then finishes the process flow. Note that, in the step S117, the notifier 30 may issue an instruction to remove the foreign object to the user. In this case, the process flow proceeds to a step S119 when the user has removed the foreign object.

In a case where no foreign object exists above the power transmitter coil unit 12 (No in the step S115), the notifier 30 notifies to that user that charging is available (step S119). When the user stops a running system of the vehicle 10 (Yes in the step S121), the process flow proceeds to a step S123 and the controller 14 lifts up the power transmitter coil unit 12 by controlling the lifting device to make it close to (contacted with) the power receiving coil unit 22 (step S123). Then, the controller 14 starts charging (step S125). When the user doesn't stop the running system (No in the step S121), the process flow is looped until the running system is stopped.

(Restriction of Recursion of Foreign Object onto Bulge)

In the present embodiment, the bulge 123a is formed on the upper face of the power transmitter coil unit 12 that is provided on the ground-side and capable of being lifted up. Then, a foreign object is prevented from entering onto the power transmitter coil unit 12, especially entering into the above-explained area where the strong magnetic flux is generated during the electricity supply, by the bulge 123a.

While no electricity is supplied, the power transmitter coil unit 12 is lowered down at the ground level, and thereby the surrounding surface 123b positions at the same height level as the ground. Here, the bulge 123a is at a higher level than the ground, so that it is quite unlikely that a foreign object climbs up from the surrounding surface 123b onto the bulge 123a except when it is a living object such as an insect (it is an exceptionally rare case and the living object will moves to some other place). In addition, wind may carry it onto the bulge 123a, but wind may further carry it from the bulge 123a to some other place. Furthermore, it is quite unlikely that a foreign object returns onto the bulge 123a after once dropping off from the bulge 123a to the surrounding surface 123b, and thereby a foreign object can be prevented from entering onto the bulge 123a and then remains there.

Note that, in cases explained above, there is possibilities that a foreign object enters onto the surrounding surface 123b and then remains there. However, as explained above, the power transmitter coil unit 12 is lifted up to be made close to (contacted with) the power receiving coil unit 22 in the present embodiment, so that the power output required for the electricity supply is reduced by itself. Therefore, affection to the electricity supply can be avoided sufficiently by restricting a foreign object from entering into the area of the strong magnetic flux that corresponds to the bulge 123a.

Then, even if a foreign object remains on the surrounding surface 123b outside the area of the strong magnetic flux and the electricity supply is started, the electricity supply hardly affected by it. Even if it is metal, excessive temperature rise can be avoided because of the weak magnetic flux.

Especially, the first FOD coil 121 is provided so as to be associated with the surrounding surface 123b in the present embodiment, so that a foreign object on the surrounding surface 123b can be detected by using the first FOD coil 121. Therefore, it can be avoided in the present embodiment that the electricity supply is started while a foreign object remains on the surrounding surface 123b.

Subsequently, the power transmitter coil unit 12 is lifted up so as to be made close to (contacted with) the power receiving coil unit 22 during the electricity supply. Depending on a size of a foreign object, the power transmitter coil unit 12 cannot be made close to (contacted with) the power receiving coil unit 22 when a large foreign object remains on the bulge 123a, so that existence of the object can be detected. It can be detected by the distance sensor 20 or through a state of the actuator of the lifting device whether or not the power transmitter coil unit 12 has been made close to (contacted with) the power receiving coil unit 22. Especially, the second FOD coil 122 is provided in the present embodiment, so that a foreign object on the bulge 123a can be detected by using the second FOD coil 122. A small foreign object can be detected by the second FOD coil 122. Therefore, it can be also avoided in the present embodiment that the electricity supply is started while a foreign object remains on the bulge 123a.

In addition, the bulge 123a is made close to (contacted with) the power receiving coil unit 22 during the electricity supply. Then, the positions of the two are high from the ground, and the vehicle body functions as the shielding material. Therefore, incursion of a foreign object between the bulge 123a and the power receiving coil unit 22 can be prevented surely while the electricity is supplied. In the present day, charging of an EV or a PHV takes longer time than filling of gasoline. However, even if, during the long charging time, a foreign object is carried by wind or even if someone drops and scatters something near a vehicle, incursion of a foreign object between the bulge 123a and the power receiving coil unit 22 can be prevented surely. As the result, affection to the electricity supply can be avoided sufficiently by restricting a foreign object from entering into the area of the strong magnetic flux that corresponds to the bulge 123a.

Further, since the bulge 123a is made close to (contacted with) the power receiving coil unit 22 during the electricity supply, the position of the surrounding surface 123b is also high from the ground and the vehicle body functions as the shielding material. Therefore, incursion of a foreign object between the surrounding surface 123b and the vehicle body can be also prevented surely while the electricity is supplied. As the result, a foreign object can be prevented from entering onto the surrounding surface 123b, so that affection to the electricity supply can be avoided sufficiently. Note that, even if a foreign object enters onto the surrounding surface 123b, the electricity supply is hardly affected by it as explained above. In addition, the first FOD coil 121 is also provided in the present embodiment as explained above.

Note that the power transmitter coil 120 is forms to have an oval outline shape in the above embodiment, but may be formed to have a precise circular shape, an ellipsoidal shape or a multangular shape. In such a case, it is preferable that the power receiving coil 220 and the bulge 123a are also formed to have a shape corresponding to that of the power transmitter coil 120. In addition, the second FOD coil 122 for detecting a foreign object on the bulge 123a is also provided in addition to the first FOD coil 121 in the above embodiment. However, if incursion of a foreign object onto the bulge 123a can be ensured sufficiently by forming the bulge 123a, the second FOD coil 122 may not be provided. Further, the lifting device vertically moves the power transmitter coil unit 12 in the above embodiment, but may move the power transmitter coil unit 12 upward in a curved manner or in an obliquely straight manner.

Furthermore, the upper face of the bulge 123a is formed as a flat surface in the above embodiment, but may be formed as a slightly curved surface or a slightly sloped surface to be slanted downward from the center of the bulge 123a such that sands and rainwaters easily drop down onto the surrounding surface 123b. Note that the contactless electricity supply system according to the present invention can be applied to an electricity supply system in which a power transmitter coil and a power receiving coil are magnetically coupled with each other, and can be applied to a resonant capacitive coupling type electricity supply system in addition to an electromagnetic inductive coupling type electricity supply system.

INDUSTRIAL APPLICABILITY

The present invention can be applied to a contactless electricity supply system installed in a vehicle.

REFERENCE SIGNS LIST 10 vehicle
12 power transmitter coil unit
120 power transmitter coil
120a inner circumferential edge (of the power transmitter coil 120)
121 first FOD coil
122 second FOD coil
122a outer circumferential edge (of the second FOD coil 122)
123 case
123a bulge
123b surrounding surface
123c boundary inner circumferential edge (of the bulge 123a)
22 power receiving coil unit
220 power receiving coil
15 base
17 lifting link mechanism (lifting device)
18 drive motor (lifting device)
301 part (protruding downward from the bottom face of the power receiving coil unit 22)
Y perpendicular line (perpendicular plane)
Z reference oblique line (reference oblique plane)
A protruding length (of the part 301)
B height (of the bulge 123a)
O winding center axis (of the power transmitter coil 120)

The invention claimed is:

1. A contactless electricity supply system for a vehicle, the system comprising:
a power transmitter coil unit provided on a ground-side; and
a lifting device that lifts up the power transmitter coil unit from the ground, wherein
the power transmitter coil unit includes a power transmitter coil that supplies electricity contactlessly to a power receiving coil unit provided on a vehicle-side by magnetically coupling with a power receiving coil housed in the power receiving coil unit, and a case that houses the power transmitter coil, a first foreign object detection coil and a second foreign object detection coil, the power transmitter coil is wound in a planar manner about a winding center axis, a bulge is formed around the winding center axis on an upper face of the case so as to bulge upward from a surrounding surface, the first foreign object detection coil is disposed on the power transmitter coil, and detects a foreign object above the power transmitter coil based on induction voltage generated in the first foreign object detection coil, and the second foreign object detection coil is disposed beneath the bulge, and detects a foreign object on the bulge based on induction voltage generated in the second foreign object detection coil.

2. The contactless electricity supply system according to claim 1, wherein an inner circumferential edge of the power transmitter coil is disposed on an inward side of the bulge in a plan view.

3. The contactless electricity supply system according to claim 1, wherein, in a cross-sectional plane, which includes an arbitrary point on an inner circumferential edge of the power transmitter coil, which is perpendicular to a tangential line of the inner circumferential edge at the arbitrary point, and which is parallel to the winding center axis, an outer circumferential edge of the second foreign object detection coil is disposed on an inward side from a boundary inner circumferential edge of the bulge on an inner surface of the case.

4. The contactless electricity supply system according to claim 2, wherein, when a perpendicular line that passes through the inner circumferential edge and is perpendicular to the power transmitter coil and a reference oblique line that passes through the inner circumferential edge and is oblique at 60° with respect to the perpendicular line to an outer side are defined in a cross-sectional plane, which includes an arbitrary point on the inner circumferential edge, which is perpendicular to a tangential line of the inner circumferential edge at the arbitrary point, and which is parallel to the winding center axis, and the bulge is disposed inside a reference oblique plane formed by the reference oblique line along an entire circumference of the inner circumferential edge.

5. The contactless electricity supply system according to claim 2, further comprising:

the power receiving coil unit attached to a bottom of the vehicle, wherein a size of the power receiving coil unit in the plan view is identical to a size of the bulge in the plan view, and, at the bottom of the vehicle within an area of a size of the power transmitter coil unit in the plan view with the power receiving coil unit and the bulge made coincident with each other, a protruding length of a part, which protrudes from a bottom face of the power receiving coil unit, from the bottom face is made smaller than a height of the bulge from the upper face of the case.

* * * * *